April 19, 1938.   M. E. HUMMEL ET AL   2,114,494
INSECT EXTERMINATION
Filed Aug. 12, 1935   2 Sheets-Sheet 1
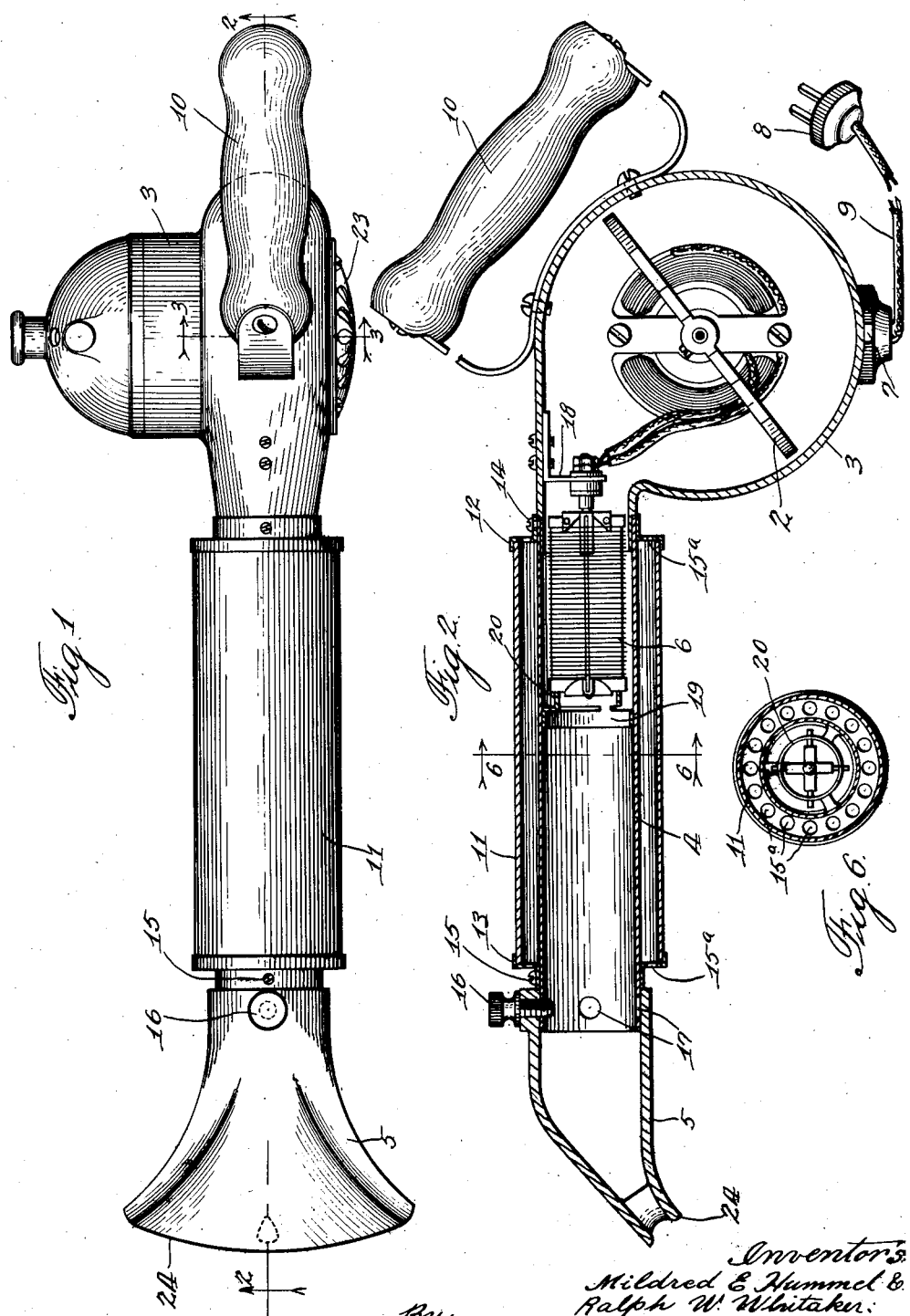
Inventors
Mildred E. Hummel &
Ralph W. Whitaker

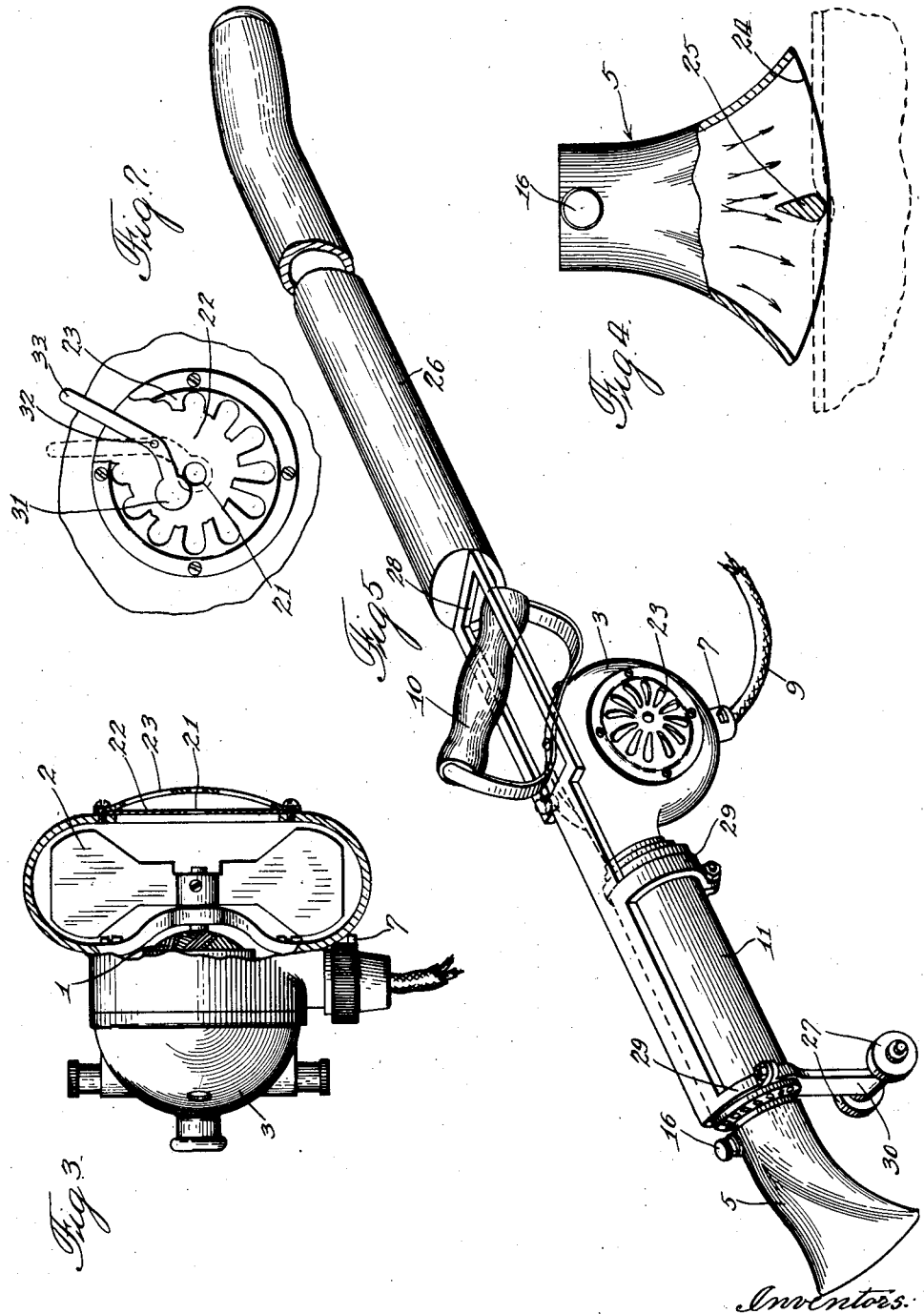

Patented Apr. 19, 1938

2,114,494

UNITED STATES PATENT OFFICE 2,114,494

INSECT EXTERMINATION

Mildred E. Hummel and Ralph W. Whitaker, Chicago, Ill.

Application August 12, 1935, Serial No. 35,831

2 Claims. (Cl. 21—2)

Our invention relates to an insect exterminator.

One of the objects of our invention is to provide a light, portable tool easily manipulated and applied, which will destroy substantially instantaneously not only the insects themselves but also their eggs and larvae without the use of chemicals and without injury to the material of the fabrics, etc., to which the tool is applied. This is accomplished by the use of a light, portable tool which delivers a current of heated air through a nozzle shaped to facilitate the application of the tool to the material and places being treated, the air being supplied at proper velocity and temperature to insure the substantially instantaneous extermination of all insects and their eggs and larvae by causing protein coagulation.

Further objects and advantages of the invention will be apparent from the specification and claims.

In the drawings, in which two forms of our invention are shown,

Figure 1 is a plan view of one form of tool;

Fig. 2 is a section on the line 2—2 of Fig. 1;

Fig. 3 is a section on the line 3—3 of Fig. 1;

Fig. 4 is a plan view partly in section of the nozzle;

Fig. 5 is a perspective view showing another embodiment of our invention;

Fig. 6 is a section on the line 6—6 of Fig. 2; and

Fig. 7 is a detail view showing a velocity controlling valve.

Referring to the drawings in detail, and first to Figs. 1 to 4, inclusive, the construction shown comprises an electric motor 1, a rotary air impeller 2 driven by the motor, a housing 3 for the motor and impeller, a tubular conduit 4 to which the air is delivered from the impeller, a nozzle 5 supplied with air from the tubular conduit 4, an electric heating element 6 in the tubular conduit, a switch 7 for controlling the current for the motor 1 and heating element 6, a plug 8 and cord 9 leading to the switch, and a handle 10 for use in manipulating the tool. Suitable leads are provided from the switch to the motor and heating element in such a manner that the single switch will control the current, both to the motor and to the heating element. The tool is so designed as to supply air to the nozzle at a velocity and temperature which will almost instantly exterminate the insects, eggs and larvae. We have found that desirable results are secured with a tool which supplies air having a temperature at the nozzle when the nozzle is unobstructed of between 140° F. and 400° F. and having a maximum velocity at the nozzle of between 5 ft. and 50 ft. per second when the nozzle is unobstructed. This causes destruction of the insects, eggs and larvae without injury to the material to which the tool is applied. While desirable results may be secured within the ranges specified, we have found that the best results are secured with a temperature around 250° F. and an air velocity of around 24 ft. per second adjacent the central portion of the nozzle when the nozzle is unobstructed. Due to the opening of the nozzle being arcuate in shape, the velocity of the air at the outermost part of the opening is considerably less than at the central portion of the opening. This comparatively low velocity of 24 ft. per second is used in order that the proportion of insects, eggs and larvae which may be blown away before the heated air of the proper temperature reaches them may be reduced to a minimum, and it also provides enough velocity to allow for the necessary penetration into cracks, crevices and folds.

While a temperature of 250° F. at the outlet of the nozzle is considerably higher than is necessary for the practically instantaneous destruction of the insects, eggs and larvae, we have found it advisable to use this higher temperature in order to provide for penetration. With a velocity of 24 ft. per second at the outlet of the nozzle the temperature and velocity of the heated air decreases rapidly when discharging into the atmosphere, and for that reason it is essential that we use this comparatively high temperature in order that the heated air will be effective at a short distance from the nozzle.

In exterminating in places like cracks behind baseboards it is sometimes necessary to use an air velocity higher than 24 ft. per second in order to provide for a greater penetration of the heated air. When the nozzle of the tool is applied in close contact with the crack the area of the nozzle opening is restricted, and this condition causes an increase in the air velocity which provides for the necessary penetration.

While the temperature at the outlet of the nozzle is around 250° F. when discharging freely the temperature increases when the nozzle is applied in close contact with the fabrics, due to the heated air not being as free to escape as when discharging freely into the atmosphere. Since in using this tool it will be moved along slowly, the increase in temperature above 250° F. will at no time reach the point where it would damage the fibres of fabrics.

In order to prevent injury to the operator, in handling the tool, a heat insulating sleeve 11 is provided surrounding the hot air conduit and spaced therefrom. This heat insulating sleeve may be of any suitable material, such as fibre or "Bakelite". It may be secured in place by means of flanged ferrules 12 and 13 slipped on over the hot air conduit 4. The inner end of the hot air conduit and the inner ferrule 12 may be secured in place on the housing by means of screws 14 extending through the ferrule and conduit and threaded into the housing 3. The outer ferrule 13 may be secured to the conduit by means of screws 15 extending through the ferrule and threaded into the conduit 4. The ferrules 12 and 13 may be provided with apertures 15a to enable the circulation of air between the conduit 4 and sleeve 11 for cooling purposes. The nozzle 5 may be secured to the outer end of the hot air conduit 4 by means of a screw 16 threaded in the nozzle and extending into any one of a number of holes 17 circumferentially spaced about the end of the hot air conduit.

The heating element 6 may be secured to the housing 3 by means of an L-shaped bracket 18 secured to the housing 3, as shown in Fig. 2, on which bracket the heating element 6 is mounted. The outer end of the heating element may be supported and positioned by means of a spider 19 secured inside the hot air conduit 4 and having a ring portion 20 bearing against and supporting the outer end of the heating element. The openings in the spider enable a flow of air both inside and outside of the ring portion 20.

The air impeller 2 may be mounted on the motor shaft, as shown in Figs. 2 and 3. The supply of air to the impeller is through a small opening 21 in a plate 22 secured to the side of the housing. A suitably apertured guard and finishing plate 23 may be secured above the air inlet controlling plate 22. The aperture 21 in the inner plate is so designed as to give the desired velocity at the nozzle.

The nozzle itself, shown in detail in Fig. 4, is so designed that the flow of air from the nozzle will not be completely blocked by the material which is being treated, the edges 24 of the nozzle for this purpose being made arcuate and a central barrier 25 being provided which will prevent the material being treated from entering too far into the nozzle. This is particularly desirable when a fold or seam is being treated. This central barrier 25 also serves to somewhat equalize the velocity of the air nozzle by deflecting it away from the central portion of the nozzle toward the side edges.

In using the tool, the heated air must be applied to all places where insects may be found, as in cracks, folds, seams, behind baseboards, along picture moldings, and moldings on floors and in cracks in walls and wallpaper. The tufts on mattresses and all folds on drapes also should be treated. If the extermination is to be a success, the operator must not overlook any cracks or places where the insects might hide.

In using the tool, the operator should apply the outermost part of the fan-shaped nozzle to the crack, fold, or seam being treated. The tool should be moved along slowly at about one-half the speed ordinarily used in ironing. The nozzle should not be pushed into the crack, mattress or upholstery, as the heated air must be free to escape. The nozzle should be applied lightly and the tool moved along slowly so that the heated air will penetrate.

The construction shown in Fig. 5 is similar to that just described, except that it is modified to enable the tool to be more readily applied along portions of a rug adjacent the baseboard. For this purpose a long handle attachment 26 is provided which may be detachably secured to the insulating sleeve 11 to enable the nozzle to be applied to the rug without the necessity of the operator stooping down. A roller or rollers 27 may be provided to facilitate moving the tool around on the rug and to hold the tool properly spaced with respect to the rug. The shape of the nozzle also may be modified to enable it to conform to a flat surface being treated. The long handle may have an opening 28 to enable it to be fitted over the handle 10 which is secured to the housing. The long handle may be secured to the insulating sleeve in any suitable manner as by clamping rings 29 surrounding the insulating sleeve and clamped thereon. The rollers 27 may be mounted in any suitable manner as by means of a bracket 30 secured to one of the clamps. In using the tool with the long handle attachment, the nozzle should be applied lightly to the rug or carpet and the tool should be moved along slowly at about one-half the speed ordinarily used in ironing.

In Fig. 7 is shown a construction to enable the velocity of the air to be controlled by controlling the effective area of the port 21. For this purpose a disc valve 31 is provided, pivotally mounted at 32 on the plate 22 and operable by means of a handle portion 33. The guard plate 23 may be cut away to provide clearance for the desired movement of the handle 33. The valve may be frictionally held in adjusted position or, if desired, suitable notches may be provided in the edge of the cover plate 23 for engagement with the handle portion 33. By adjusting the valve 31 to different positions, the effective opening of the port may be varied, thus controlling the velocity of the air.

Further modifications will be apparent to those skilled in the art, and it is desired, therefore, that the invention be limited only by the prior art and the scope of the appended claims.

Having thus described our invention, what we claim and desire to secure by Letters Patent is:

1. The process of exterminating all forms of insect life located within the spaces and interstices of objects by protein coagulation of said life, which comprises forcing into said spaces and interstices a relatively confined current of heated air at a temperature of about 250° F. and at a velocity of about 24 feet per second.

2. The process of exterminating all forms of insect life located within the spaces and interstices of objects by protein coagulation of said life, which comprises producing a confined current of heated air and releasing said current from confinement in substantial contact with said object to inject the heated air into the spaces and interstices thereof at a temperature sufficient to destroy all forms of insect life substantially instantly and at a velocity low enough to avoid blowing away any of said insect life prior to extermination, the temperature of said heated air at the point of injection being about 250° F. and the velocity of the air at the point of injection being not substantially above 50 feet per second.

MILDRED E. HUMMEL.
RALPH W. WHITAKER.